No. 758,014. PATENTED APR. 19, 1904.
A. MIESSE.
AUTOMOBILE FENDER.
APPLICATION FILED JULY 1, 1903.
NO MODEL. 2 SHEETS—SHEET 1.
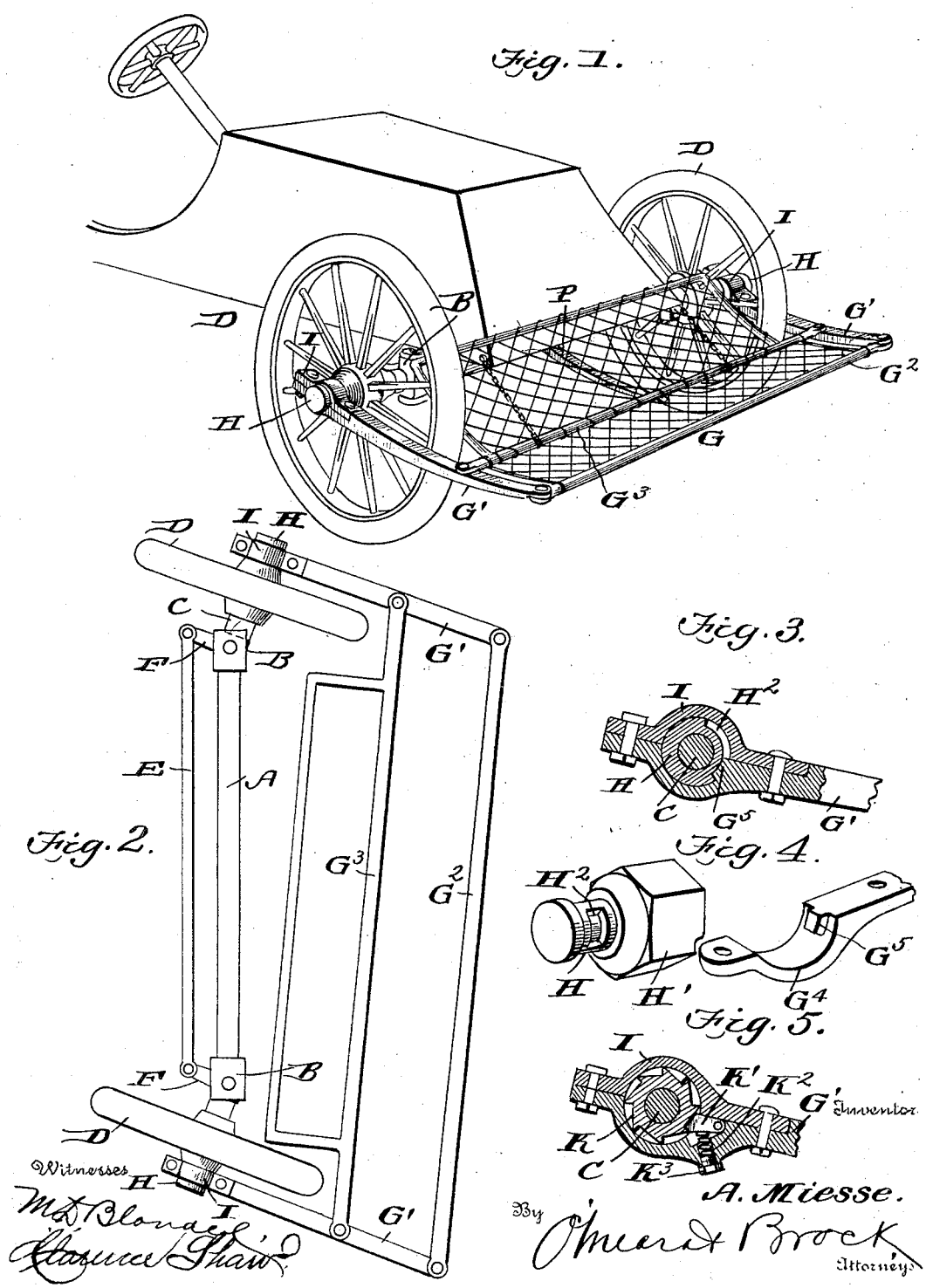

No. 758,014. PATENTED APR. 19, 1904.
A. MIESSE.
AUTOMOBILE FENDER.
APPLICATION FILED JULY 1, 1903.
NO MODEL. 2 SHEETS—SHEET 2.
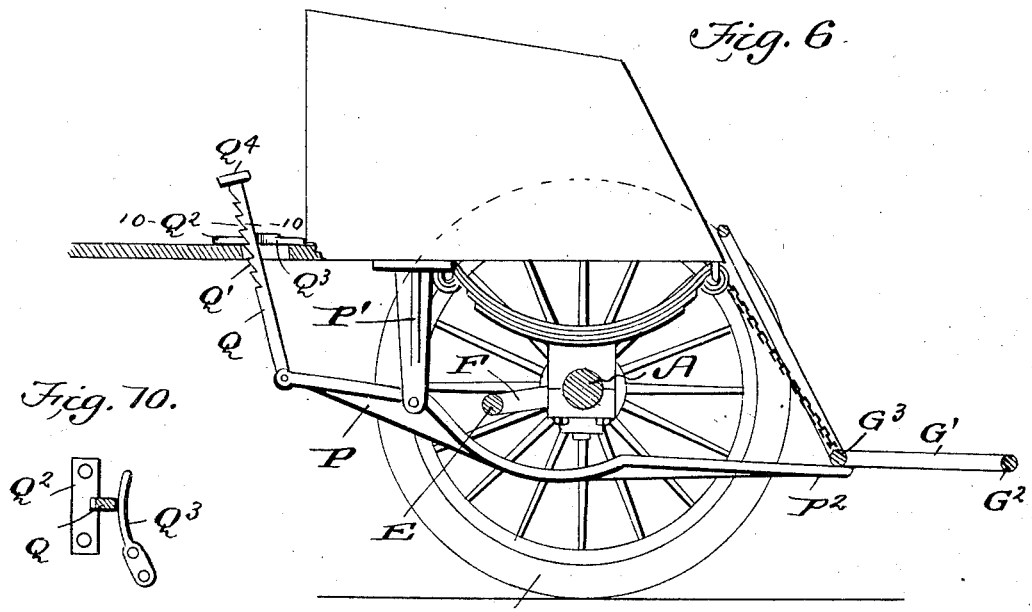
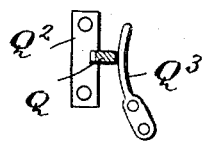
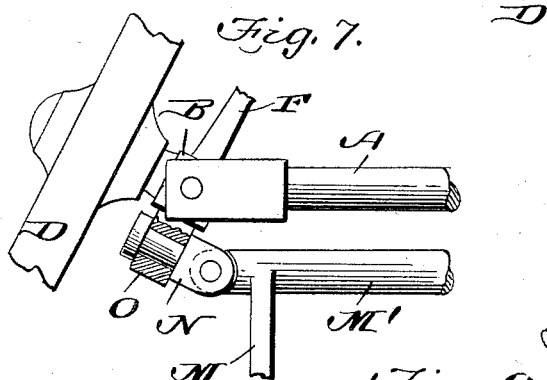
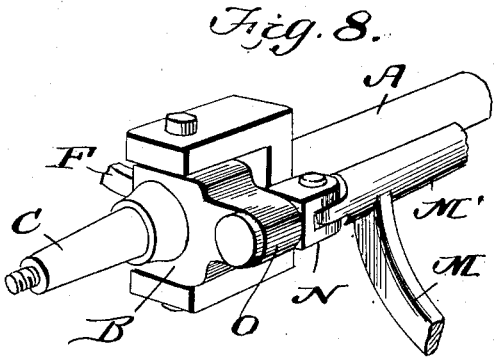
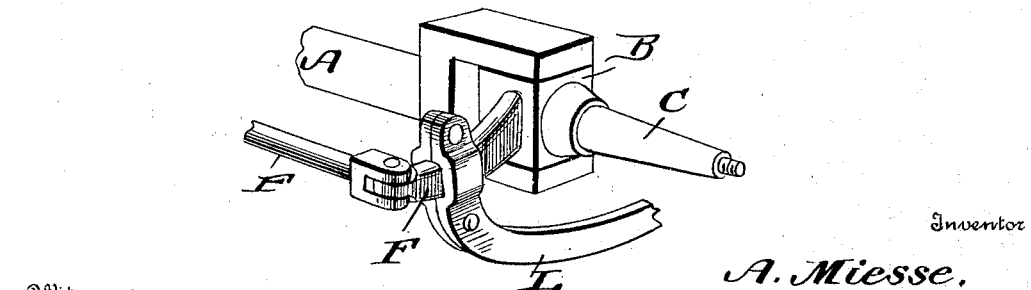

No. 758,014. Patented April 19, 1904.

UNITED STATES PATENT OFFICE.

AMERICUS MIESSE, OF LIMA, OHIO, ASSIGNOR OF ONE-HALF TO ABRAHAM CRIDER, OF LIMA, OHIO.

AUTOMOBILE-FENDER.

SPECIFICATION forming part of Letters Patent No. 758,014, dated April 19, 1904.

Application filed July 1, 1903. Serial No. 163,925. (No model.)

*To all whom it may concern:*

Be it known that I, AMERICUS MIESSE, a citizen of the United States, residing at Lima, in the county of Allen and State of Ohio, have invented a new and useful Improvement in Automobile-Fenders, of which the following is a specification.

This invention is a fender for automobiles or self-propelling vehicles of all kinds and descriptions; and the object of the invention is to provide a fender which will be shifted or moved laterally as the front wheels are turned for the purpose of steering the vehicle.

So far as I am aware, fenders have been connected to the body portions of the vehicles and cars and whenever the vehicle or car was turned the fender has traveled in a path in advance of the vehicle or car, but not in advance of the front wheels upon which the said vehicle or car travels, and numerous accidents have occurred for this reason.

The object of my invention, therefore, is to provide a fender which can be arranged in front of an automobile and which will turn with the front wheels, keeping always in advance of them; and with this object in view the invention consists, broadly, in connecting the fender to the stub-axles of the automobile, or to the knuckles carrying said stub-axles, or to any convenient turnable or shiftable portion of the running-gear.

The invention consists also in providing a fender of this kind which can be raised or lowered, as desired.

The invention consists also in certain details of construction and novelties of combination hereinafter fully described, and pointed out in the claims.

In the drawings forming part of this specification, Figure 1 is a perspective view showing the front portion of an automobile with my improved construction of fender connected thereto. Fig. 2 is a detail plan view of the fender-frame and a portion of the running-gear of the vehicle and illustrating the manner in which the fender moves in unison with the front wheels of the vehicle. Figs. 3, 4, and 5 are detail views showing the manner of connecting the side bars of the fender to the ends of the axle. Fig. 6 is a detail view showing in elevation means for raising the fender. Fig. 7 is a detail plan view showing the manner of connecting the fender to the knuckle carrying the stub-shaft. Fig. 8 is a detail perspective view showing the construction illustrated in Fig. 7. Fig. 9 is a detail perspective view showing a still further modification. Fig. 10 is a detail sectional view on the line 10 10 of Fig. 6 and showing the spring for holding the ratchet-bar in engagement with the plate.

Referring to the drawings, A indicates the front axle of an automobile, and B the knuckles, pivoted at the opposite ends of said axle; C, the stub-shafts, projecting laterally from said knuckles; D, the front wheels, mounted upon the stub-axles, and E the shifting rod, which is connected to the knuckles by the arms F, and it will be understood that any suitable form of mechanism may be employed in shifting the bar E and turning the front wheels of the vehicle.

G indicates the fender arranged in advance of the automobile, comprising a frame and a net connected thereto. The frame consists of the side bars $G'$, front cross-bar $G^2$, and the intermediate cross-bar $G^3$, said cross-bars being pivotally connected to the side bars, so that said side bars can be swung from side to side as the front wheels of the vehicle are turned, said side bars always remaining in parallel relation to each other. The side bars of the fender-frame are connected to the ends of the axles, as shown in Figs. 1 and 2, or they may be connected to the arms F, carried by the knuckles, as shown in Fig. 9, or the rear portion of the fender can be connected directly to the knuckles, as shown in Figs. 7 and 8, as it is immaterial how the fender is connected so long as said fender is connected to the movable or turnable portions of the running-gear and is movable in unison with the front wheels of the vehicle. In Fig. 1 I have shown the side bars connected to the ends of the axles, and in Figs. 3 and 4 I have shown details of construction. The rear end of the side bar is curved, as shown at $G^4$, in order to receive the cap H of the axle-nut H', and the side bar carries a lug G⁵ at the forward end of the curved portion G⁴, which engages a recess H², produced in the cap of the nut, and a clip I is bolted over the cap of the nut and to the rear end of the side bar, thus pivotally connecting the side bars to the cap of the nut, and the lug G⁵, working in the slot H², permits a limited vertical movement of the fender. In Fig. 5 I have shown the cap of the nut as constructed with a ratchet-surface K, and the side bar carries a spring-actuated pawl K' for the engagement of said surface, the spring K² being held in place by a screw-plug K³, and it is obvious from this construction that when the fender is lifted up the spring-pawl engaging the ratchet-surface of the nut will hold the fender in its elevated position, and when it is desired to drop the fender it is only necessary to unscrew the plug K³ and relieve the tension of the spring upon the pawl.

In Fig. 9 I have shown the side bars L connected to the arms F, whereas in Figs. 7 and 8 the side bars M are connected to the rear bar M', the ends of which are pivotally connected to a coupling N, loosely mounted in an extension O, carried by the knuckle B, said construction permitting the fender to be raised and lowered, as desired, and also shifting the fender laterally as the vehicle is steered.

For the purpose of raising the fender I employ a lever P, pivoted to a depending bracket P', the forward end of the lever P² contacting with the cross-bar G³ of the fender-frame, and to the rear end of the lever is pivotally connected a push-rod Q, having the ratchet-teeth Q', which engage a plate Q² and are held in engagement with said plate by means of a spring Q³, the upper ends of the push-rod being provided with a foot-piece Q⁴, and by pushing down upon this rod the rear end is depressed and the forward end raised, thereby elevating the fender, and the rod being held in engagement with the plate the fender will be held in its elevated position. When it is desired to drop the fender, the rod is pushed out of engagement with the plate and the weight of the fender will cause it to drop, carrying the forward end of the lever downwardly and throwing the rear end and push-rod upwardly.

It will thus be seen that I provide a fender for automobiles arranged in advance of the front wheels and will turn in unison with said front wheels, so that it will always be in the path of travel of said wheels, thereby protecting them at all times.

Having thus fully described my invention, what I claim as new, and desire to secure by Letters Patent, is—

1. The combination with the front axle, front wheels, and movable connections carried by the axle and to which the wheels are attached, and the fender connected to the said movable connections, as set forth.

2. The combination with the front axle, the wheels and the movable connections carried by the axle and carrying the wheels, of the fender connected with the said movable connections, said fender comprising the side bars and the parallel cross-bars pivotally connected at their opposite ends to the side bars, as set forth.

3. The combination with the front axle and knuckles, of the fender connected with the said knuckles and adapted to move in unison with said knuckles and means for raising the fender, as set forth.

4. The combination with the front axle and knuckles, of the fender connected with the knuckles and movable in unison therewith, the fender being movable vertically with reference to the knuckles and axle, the lever for lifting the fender, the push-rod for operating the lever and means for locking the push-rod, as set forth.

5. The combination with the stub-axles carried by the knuckles, of the side bars of the fender connected to the said stub-axles and capable of a vertical movement thereon, the connecting cross-bars pivotally connected to the side bars of the fender, and means for holding the fender in any adjusted position, substantially as set forth.

6. A fender comprising parallel side bars, the parallel cross-bars pivotally connected to the side bars, together with means for connecting the rear end of the fender to the movable portions of the running-gear of an automobile, whereby the said fender can be swung laterally in unison with the front wheels of the vehicle, substantially as set forth.

AMERICUS MIESSE.

Witnesses:
 CHAS. E. BROCK,
 CLARENCE SHAW.